United States Patent [19]

Youngquist et al.

[11] Patent Number: 4,818,064

[45] Date of Patent: Apr. 4, 1989

[54] SENSOR ARRAY AND METHOD OF SELECTIVE INTERFEROMETRIC SENSING BY USE OF COHERENCE SYNTHESIS

[75] Inventors: Robert C. Youngquist, Deland, Fla.; Robert H. Wentworth, Palo Alto; Kenneth A. Fesler, Sunnyvale, both of Calif.

[73] Assignee: Board of Trustees Stanford Junior University, Stanford, Calif.

[21] Appl. No.: 100,483

[22] Filed: Sep. 24, 1987

[51] Int. Cl.$^4$ .............................................. G02B 6/28
[52] U.S. Cl. ................................ 350/96.15; 250/227; 350/96.29; 356/345; 356/349; 370/3
[58] Field of Search ............... 350/96.15, 96.16, 96.29; 356/349, 350, 345; 250/227; 370/1, 3; 455/610, 612

[56] References Cited

U.S. PATENT DOCUMENTS

| | | | |
|---|---|---|---|
| 4,334,781 | 6/1982 | Ozeki | 356/368 |
| 4,432,599 | 2/1984 | McMahon | 350/96.15 |
| 4,443,700 | 4/1984 | Macedo et al. | 250/227 |
| 4,545,253 | 10/1985 | Avicola | 73/655 |
| 4,572,949 | 2/1986 | Bowers et al. | 250/227 |
| 4,632,551 | 12/1986 | Pavlath | 356/345 |
| 4,637,722 | 1/1987 | Kim | 356/350 |
| 4,639,138 | 1/1987 | Martin et al. | 356/350 |
| 4,653,916 | 3/1987 | Henning et al. | 356/345 |
| 4,681,395 | 7/1987 | Lindsay et al. | 350/96.16 |
| 4,687,330 | 8/1987 | Lefevre | 356/350 |
| 4,697,146 | 9/1987 | Extance et al. | 350/96.29 X |
| 4,697,926 | 10/1987 | Youngquist et al. | 356/349 X |
| 4,699,513 | 10/1987 | Brooks et al. | 356/345 |

FOREIGN PATENT DOCUMENTS 3044183  6/1982  Fed. Rep. of Germany .

OTHER PUBLICATIONS

J. L. Brooks et al., *Fiber-Optic Interferometric Sensor Arrays with Freedom From Source Phase-Induced Noise*, Optics Letters, vol. 11, No. 7, Jul. 1986.

K. Blotekjaer et al., *Choosing Relative Optical Path Delays in Series-Topology Interferometric Sensor Arrays*, Journal of Lightwave Technology, vol. Lt-5, No. 2, Feb. 1987, pp. 229-235.

(List continued on next page.)

Primary Examiner—John D. Lee
Attorney, Agent, or Firm—Knobbe, Martens, Olson & Bear

[57] ABSTRACT

A sensor array and method for remotely monitoring environmental effects on a selected sensor. In a sensor array comprising a plurality of interferometers, an optical signal of a selected configuration is provided so that portions of the optical signal are propagated through the interferometers. The optical signal configuration causes optical signal portions which have traveled the same signal path, except where separated on signal paths in a selected interferometer, to coherently mix when combined at an output of the selected interferometer. No other optical signal portions in the sensor array will coherently mix. The optical signal comprises plural components such as side bands which are configured to form a power spectrum defining an optical signal coherence function having a maximum which repeats periodically at a rate substantially corresponding to optical signal travel time difference in the selected interferometer. Also, the coherence function has minimums or zero values at times such that intervals between various minimums substantially correspond to optical signal travel time differences through non-selected interferometers, thus precluding coherent mixing of optical signal portions emerging from those non-selected interferometers. By modifying characteristics of the optical signal components, one may change the repetition period of the coherence function maximum and of selected coherence function minimums to produce coherent mixing of signal portions from another interferometer while precluding coherent mixing of signals from all other interferometers, including the previously selected interferometer. Accordingly, a given sensor may be selected from monitoring, to the exclusion of all others.

43 Claims, 6 Drawing Sheets

OTHER PUBLICATIONS

S. K. Sheem et al., *Wavelength Monitoring of Single-Mode Diode Laser Using Guided-Wave Interferometer,* Optics Letters, May 1980, pp. 179–181.

E. L. Green et al., *Remote Passive Phase Sensor,* O.F.S. 1985 (paper).

S. A. Kingsley et al., *OFDR Diagnostics for Fiber/Integrated Optic Systems and High Resolution Distributed Fiber Optic Sensing,* S.P.I.E. vol. 566, Fiber Optic and Laser Sensors III (1985), pp. 265–275.

Arthur R. Nelson et al., "*Passive Multiplexing Techniques for Fiber Optic Sensor Systems*", I.F.O.C., Mar. 1981, pp. 27–30.

J. E. Bowers, "*Fiber-optical Sensor for Surface Acoustic Waves*", Applied Physics Letters, Aug. 1982, pp. 231–233.

Henning et al., "*Optical Fibre Hydrophones with Down Lead Insensitivity*", Proceedings of the First International Conference on Optical Fibre Sensors, London.

Giles, I. P. et al., *Coherent Optical-Fibre Sensors with Modulated Laser Sources,* Electronics Letters, vol. 19, No. 1 (1983), pp. 14–15.

D. Uttam, et al., *Remote Interferometric Sensors Using Frequency Modulated Laser Sources,* First International Conference on Optical Fibre Sensors, London, pp. 182–184.

Al-Chalabi, S. A., et al., *Partially Coherent Sources in Interferometric Sensors,* IEEE, Proceedings of the First International Conference on Optical Fibre Sensors, pp. 132–135.

Bosselmann et al., *High-Accuracy Position-Sensing with Fiber-Coupled White-Light Interferometers,* Second International Conference on Optical Fibre Sensors, Stuttgart, Sep. 84, pp. 361–364.

Thornton, S. W. et al., *Experimental Performance of an Optical Hydrophone with Downlead Sensitivity,* Second International Conference on Optical Fibre Sensors, Stuttgart, Sep. 84, pp. 369–373.

Dakin, J. P. et al., *Optical Fibre Hydrophone Array-Recent Progress,* Second International Conference on Optical Fibre Sensors, Stuttgart, Sep. 84, pp. 375–379.

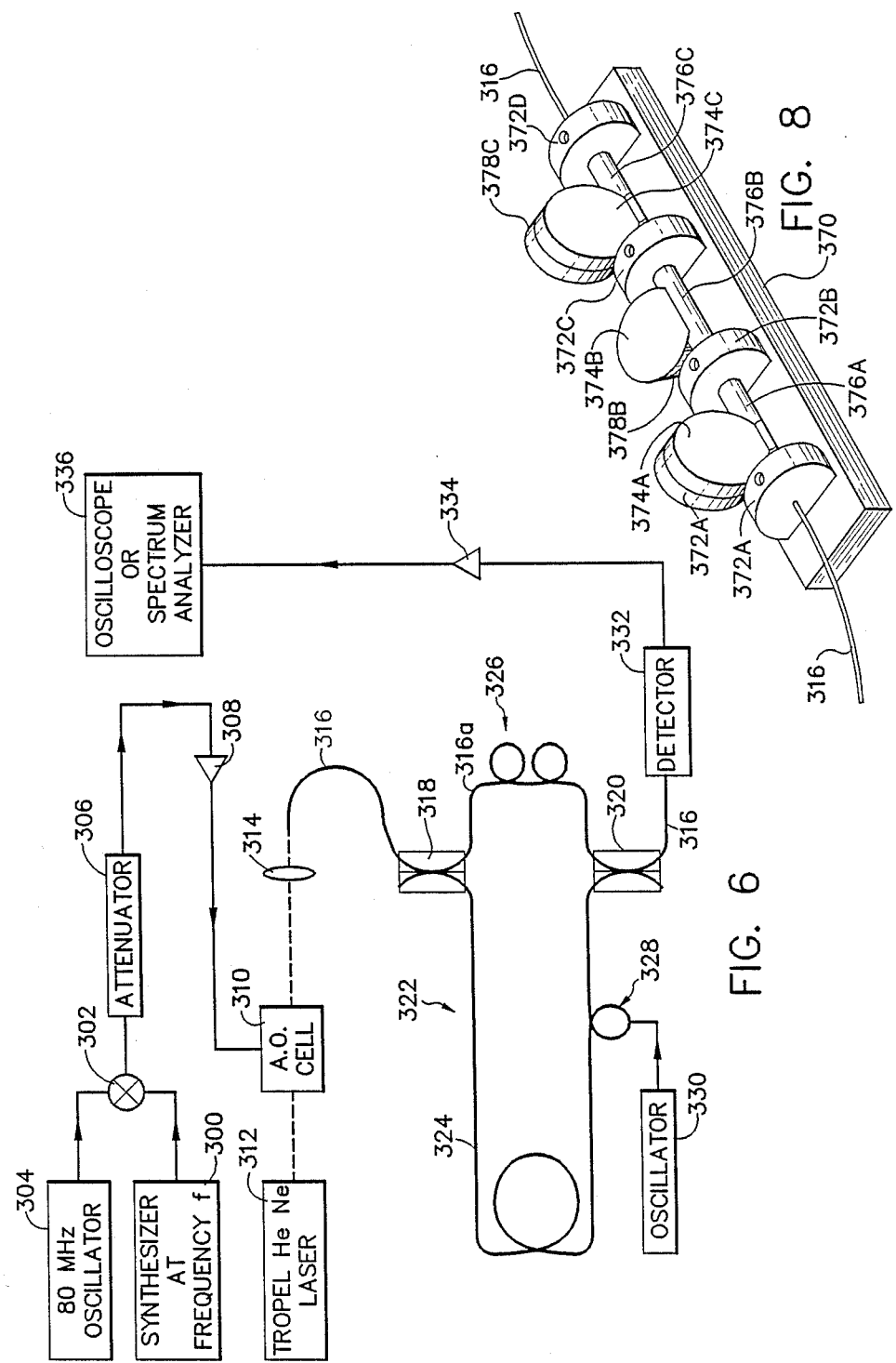

SENSOR ARRAY AND METHOD OF SELECTIVE INTERFEROMETRIC SENSING BY USE OF COHERENCE SYNTHESIS

BACKGROUND OF THE INVENTION

The present invention relates to fiber-optic sensors and particularly to distributed fiber-optic sensor arrays wherein multiple sensors are individually monitored.

Over the past few years, fiber-optic devices have been actively studied and developed for use in various sensing applications in a wide range of fields. One reason for this interest is the sensitivity of optical fibers to environmental conditions which surround them. For example, factors such as temperature, pressure, and acoustical waves directly affect the light transmitting characteristics of optical fiber. These changes in the optical fiber produce a change in the phase of light signals traveling in the fiber. Thus, a measurement of the change in phase of optical signals which have been transmitted through that fiber is representative of changes in those environmental conditions which have affected the fiber.

Recently, particular efforts have been directed to the development of systems having sensors organized in arrays, so that a number of sensors can utilize light from a single source, and provide environmental information at a common detection location. Ideally, such an array would consist of a fiber input bus which would distribute light comprising an optical carrier to a set of sensors. Each sensor would imprint information about the environment to this optical carrier. An output fiber bus would then collect this light from the sensors and carry it back to a central information processing location where information obtained from any selected one of the sensors could be readily identified and analyzed.

The goal of these development efforts is to produce sensor arrays which could be used for specific applications such as monitoring rapidly changing environmental conditions. For example, such sensor arrays could be used to detect acoustic waves in applications such as geophysical surveying, in order to determine the source location and acoustical characteristics of those waves. For many such applications, it may be necessary to space the arrays over a relatively large area. In these situations, the replacement of electrical lines by fiber optics, for example, would overcome problems such as electrical pickup, cable weight, and safety hazards associated with the use of those electrical lines. Even when the sensor is used in limited space, the removal of electronics and bulk optics components generally should provide improved system performance due to reduced noise.

Combining the returns from different sensors onto a single fiber minimizes the number of fibers used in the sensor array, thereby further reducing the bulk and weight of the system. However, this feature creates another design challenge by necessitating some technique by which information from each sensor can be separated for individual identification from among all of the information arriving at the central processing location on the single fiber. Distributed sensing systems developed previously have generally applied one of two approaches for separating information of an individual sensor from a single data stream.

The first approach comprises time-division multiplexing of the sensor outputs, as is described by A. R. Nelson and D. H. McMahon, "Passive Multiplexing Techniques for Fiber-Optic Sensor Systems," *I.F.O.C.*, p. 27, March 1981. In time-division multiplexing, the optical input most generally is pulsed so that the input signal comprises a pulse wave form. As a result, each sensor produces a pulse which, as a consequence of the system geometry, is separated in time from the other sensor signals. Specifically, the optical input pulse communicated through each sensor is placed on the output fiber by each of the sensors at a different time. By controlling the relative position of the sensors, interleaving of the pulse signals may be accomplished as the signals are multiplexed from the sensors onto a return fiber bus. These interleaved pulse signals are then carried back to the central processing location where demultiplexing and further signal processing occur.

One problem which is inherent with this type of system is that the frequency at which the sensors may be monitored becomes limited by the number of sensors. Specifically, it is noted that a second pulse may not be transmitted from the optical source until a certain amount of time has passed. If the second pulse were transmitted through the sensor nearest the source before the optical signals from all sensors has passed the output terminal of that sensor, it is possible that signals resulting from the second pulse could pass through the first sensors in the array and be placed on the return bus prior to the passing of optical signals produced from sensors near the end of the array. This would, of course, prevent the demultiplexing and signal processing equipment from determining the relationship between the pulse signal received and its associated sensor. Such systems are, therefore, often not useful in applications requiring rapid repeated sensing of environmental conditions by each of the senors in the array.

The second approach which has been used for separating each sensor's information from the single data stream has been to frequency-division multiplex the sensor outputs, in the manner described by I. P. Giles, D. Uttam, B. Culshaw, and D. E. N. Davies, "Coherent Optical-Fibre Sensors With Modulated Laser Sources," *Electronics Letters*, Vol. 19, page 14, 1983. This approach is accomplished by frequency ramping the optical source and arranging the array geometry so that the transit time of the light from the source to a sensor and back to the central location is unique for each sensor. In this case, the array output is mixed with the source's present output, thereby producing a unique central frequency for each sensor. The environmental information is carried in the side bands about this central frequency.

One particular problem with the above-described system involves the "fly back" period when the periodic ramp signal is reset from its maximum to its minimum position. This fly back period comprises a time when system operation may not occur, since no ramp signal is present, and no meaningful results would be produced. This places some limit on the rate at which environmental conditions may change and still be reliably monitored by the sensor system.

In the case of frequency multiplexing, use of a short coherence length source typically results in a signal which includes a substantial amount of noise. In order to reduce the noise, a source having a longer coherence length may be used. However, proper operation of frequency modulation schemes normally requires modulation over a broad range of frequencies. To accomplish this, gas lasers are typically used requiring external modulators which must be fast in their operation. Use of such gas lasers and external, fast modulators increases the cost and complexity of the system, but reduces signal noise from that experienced with short coherence length sources, such as laser diodes.

Based on the above, it would be an important improvement in the art to provide a sensing system and technique for multiplexing a plurality of remote sensors without being subject to restrictions such as those identified which are inherent in the time-divison and frequency-division multiplexing schemes used in the past. Thus, the improved system should permit selection and individual monitoring of any of the sensors in the system, without the need for extensive electronics or other devices or schemes at the system output to recover signals relating to the desired sensor from among signals also relating to other sensors. A further improvement in the art would be to provide such a system which accomplishes its purpose with detection at lower frequencies such as those in the acoustic range, rather than at the higher modulation frequencies. It would be a still further improvement to provide such a system which provides minimized noise levels while requiring modulation over a narrower range and thus at a slower modulation rate than is necessary in frequency modulation using a long coherence source. Preferably, such a system should permit use of a wide range of optical sources, including continuous wave sources, and should be both simple and economical to produce and use in actual application.

BRIEF SUMMARY OF THE INVENTION

The present invention comprises a sensor array system and method in which light at more than one frequency is used to permit individual sensors in the array of the system to be selectively monitored. More specifically, in one preferred embodiment, the sensor system of the present invention generally comprises a light source whose output is optically connected to components such as modulators for synthesizing a desired coherence function to produce coherence of the light through selected interferometers in the distributed array. A portion of the modulated light is communicated through at least one sensor in the system, and is then returned to a detection location. Another portion of the modulated light is communicated to the detection location without passing through the sensor. The light at the detection location is combined and then provided to a detector for monitoring the environmental conditions influencing the sensor through which a portion of the modulated light passed.

By appropriately modulating the light from the light source, a plurality of optical side bands are formed. These side bands define a power spectrum comprised of a set of frequencies which for many cases are designed to be evenly-spaced with respect to each other. As a result, the coherence function which corresponds to this evenly-spaced power spectrum will be periodic, and preferably will be substantially equal to zero or at its minimum for all path length delays in the system corresponding to those of interferometers not to be monitored, but will be substantially equal to 1 or at its maximum for the path length delay corresponding to the interferometer to be monitored. Of course, this means that the path length delays of interferometers not to be monitored cannot be substantially the same as that of the interferometer which is to be monitored. By changing the modulation, a different coherence function is generated, whereby the detected output signal intensity is made sensitive to the sensor of an interferometer having a different path length imbalance in the system, and as a result is then also made insensitive to the sensor of the previously monitored interferometer.

The coherence function does not depend on the phase of the power spectrum frequencies which define that coherence function, so the required power spectrum may be generated by either periodic phase, frequency or amplitude modulation, or some combination of these, of a single optical frequency.

The light which is coupled at the detection location comprises a phase difference signal corresponding to the difference in phase between light which traveled through the selected sensor and light which traveled in the non-sensing path from the modulator to the detection area. This phase difference is representative of the environmental conditions affecting the selected light path in the sensor system. The detector is typically interconnected to other information processing devices for monitoring and evaluating the particular environmental conditions which have been detected.

In the operation of one preferred embodiment of the invention, each sensor imprints environmental information onto the light passing therethrough in the form of modifications to the optical phase. Light from each of the optical paths in the system, including the sensor paths and the paths which do not include sensors, is optically combined at a detection location. The power spectrum comprised of the optical frequencies or side bands which form the light signal is preferably organized to define a desired coherence function. This coherence function indicates that light having traveled two paths, whose path length difference corresponds to that of a desired interferometer will be coherent when combined at the detection location. Light traveling other path length differences which exist in the system will not be coherent when combined at the detection location. Thus, only light having traveled a selected interferometric path length difference corresponding to a selected interferometer is combined to define a phase difference which represents the environmental conditions influencing the sensor in that interferometer. A different interferometer can be selected for monitoring by appropriately changing the power spectrum to define the necessary coherence function.

The distributed array sensors of the present invention comprise a system and technique for multiplexing remote sensors which permits unambiguous selection and monitoring of individual sensors, and which minimizes the number of components necessary to obtain and monitor the environmental information from a selected sensor in the system output signal. The invention preferably accomplishes its purpose in an all fiber-optical configuration, eliminating unnecessary electronic components which degrade system performance by reducing reliability and increasing complexity.

These and other advantages and features of the present invention will become more fully apparent from the following description and appended claims taken in conjunction with the accompanying drawings.

BRIEF DESCRIPTION OF THE DRAWINGS

FIG. 6 is a schematic drawing of a system which illustrates a principle of the present invention whereby one can multiplex more than one sensor.

FIG. 8 is a perspective view of one embodiment of a fiber-optic polarization controller for use in the sensor array of the present invention.

DETAILED DESCRIPTION OF THE PREFERRED EMBODIMENT

The invention is best understood by reference to the figures wherein like parts are designated with like numerals throughout.

Figure 1:
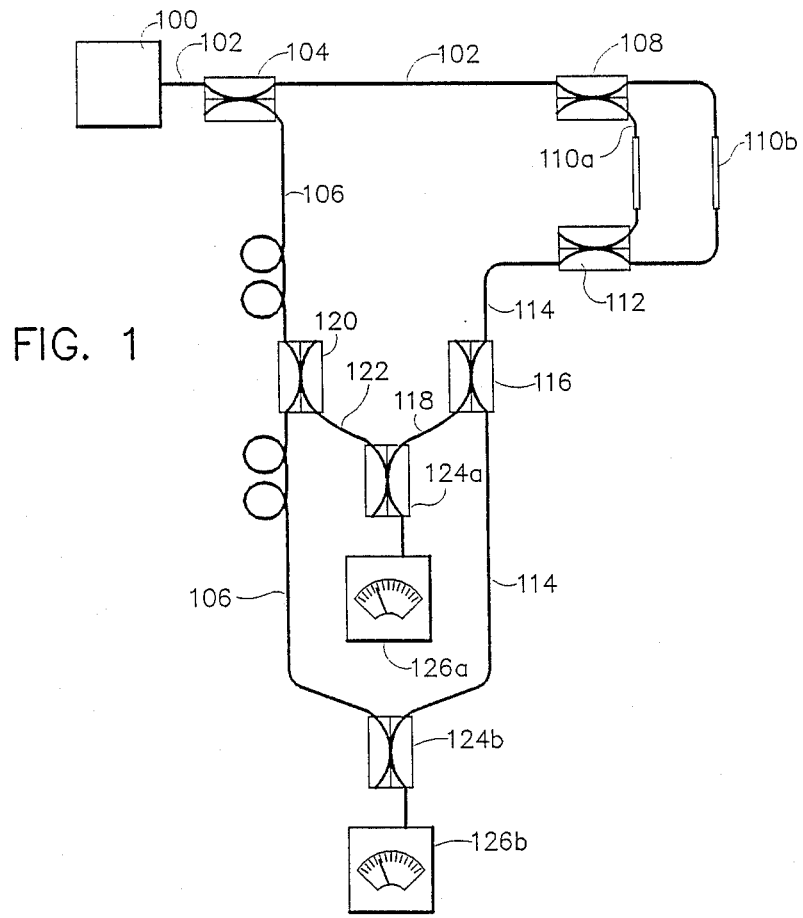
FIG. 1 is a schematic drawing of one embodiment of a distributed fiber-optic sensor system incorporating a plurality of matching path lengths to detect signals from corresponding sensor paths.

FIG. 1 illustrates one embodiment of a sensor array system for monitoring environmental conditions influencing sensors distributed in the array. This and several related systems of various configurations are described in co-pending U.S. patent application Ser. No. 699,855 entitled "Coherent Distributed Sensing Techniques Using Short Coherence Length Source," (now U.S. Pat. No. 4,697,926) and in co-pending U.S. patent application Ser. No. 738,678 entitled "Distributed Sensor and Method Using Coherence Multiplexing of Fiber-Optic Interferometric Sensors." (now U.S. Pat. No. 4,699,513) The systems disclosed in those applications are exemplary of systems which could be readily modified for use in accordance with applicants' invention as described and claimed herein. Accordingly, these pending patent applications are each incorporated herein by reference. A review of the operation of the system of FIG. 1 will assist in developing an understanding of sensor array systems, and of the developments which are disclosed herein.

The system of FIG. 1 includes a light source 100 which preferably comprises a laser diode. The light source 100 is optically coupled to an optical fiber comprising a fiber-optic input bus 102. Positioned upon input bus 102 is a first directional coupler 104, which couples some of the optical power to a second optical fiber comprising an optical delay line 106 which is preferably shielded from environmental influences. In the illustrated embodiment, the directional coupler 104 is of the same type as other directional couplers utilized in the sensor system of the present invention. One preferred embodiment of a directional coupler which may be used in the system is disclosed subsequently herein, and is described in detail in U.S. Pat. No. 4,493,528 entitled "Fiber Optic Directional Coupler," and in U.S. Pat. No. 4,536,058 entitled "Fiber Optic Directional Coupler." These patents are hereby incorporated herein by reference.

An additional optical coupler 108 is positioned at a selected location along the fiber-optic input bus 102. A plurality of optical fiber segments 110a, 110b are connected at a first end through coupler 108 to the fiber-optic input bus 102. At least a portion of each of the optical fibers 110 comprise fiber-optic sensors which are positioned in the environment so as to be sensitive to, and influenced by, changes in the environmental conditions surrounding the sensors 110. Of course, in this, as well as substantially all other embodiments of applicant's invention, devices such as transducers could be connected to the optical fibers in the system and be utilized as sensors 110 for responding to environmental effects by influencing the flow of light through those optical fibers. For example, an acoustic transducer could be connected to an optical fiber 110 to increase acoustic sensitivity of that fiber.

A second end of each of the sensors 110 is connected through a directional coupler 112 to a fiber-optic return bus 114 upon which the directional coupler 112 is positioned at a desired location. An additional directional coupler 116 is positioned on the return bus 114 at a selected location, to optically couple signals from the return bus 114 to a fiber-optic segment 118. Similarly, a directional coupler 120 is positioned at a selected location on the delay line 106, so as to optically couple signals to another optical fiber segment 122.

Optically connected to the second end of the fiber-optic segments 118 and 122, as well as to the ends of the delay line 106 and the return bus 114 are optical couplers 124a, 124b, which in turn connect an output fiber from the coupler to a detector 126a, 126b. Detectors 126 function to receive the optical signal from their connected fibers, after the signals in the fibers are coupled in couplers 124. Specifically, one preferred embodiment of a detector for use in the system of the present invention may comprise a Model HAD1100 detector, commercially available from E.G. & G. Corp., 35 Congress Street, Salem, Mass., 01970.

The length of the optical path from coupler 104 through sensor 110a to coupler 124a should substantially match the corresponding reference signal path from coupler 104 through delay line 106 to coupler 124a. Likewise, the length of the optical path from coupler 104 through sensor 110b to coupler 124b should substantially match the corresponding optical signal reference path from coupler 104 through optical fiber 106 to coupler 124b.

If additional sensor rungs were added to the ladder configuration of the system of FIG. 1, then for each rung a length of line would need to be added to the delay line 106, and an additional detector would need to be appropriately positioned to reserve signals from line 106 from the given sensor, with those signals having traveled substantially equal path lengths. As mismatch increases between the path length to a given sensor 110 and the corresponding return path length, the ability of the sensed signal to interfere with the reference signal and produce an accurate phase difference signal is reduced, approximately exponentially.

In operation, an optical signal is provided from the light source 100 to the optical input bus 102. The optical signal in bus 102 is partially coupled by the directional coupler 104 so that a portion of the optical signal travels through each of the optical paths through sensors 110a and 110b as described above, while another portion of the optical signal travels through the optical delay line 106 to coupler 124a, while some light continues in the delay line 106 to coupler 124b. It is noted that when the difference in the optical path lengths traveling through adjacent sensors 110a and 110b is much greater than the coherence length of the optical source, intensity modulation does not occur upon collection of the optical signals onto the fiber-optic return bus 114, and thus the signals do not interfere with one another.

With the optical path lengths through the delay line 106 appropriately matched to respective path lengths through the sensors 110, the optical signal intensity detected in detector 126a is sensitive to changes in the optical path length difference between light received from the delay line 106 and light traveling the optical path through sensor 110a. However, because the length of the optical path through sensor 110b is very different than the length of the path through sensor 110a, the output signal intensity detected in detector 126a is insensitive to changes in the length of the optical path through sensor 110b. Similarly, the output signal intensity at the detector 126b is sensitive to optical path length changes in sensor 110b, but not in sensor 110a.

Assuming there is no influence on the signals due to losses in couplers and other elements of the system, the relative phase of the signals combined in couplers 124 should be unchanging unless environmental influences affect one of the optical paths. Thus, the phase difference signals transmitted through detectors 126 represent the environmental conditions which have influenced the phase of the optical signal transmitted through the associated sensor path.

Figure 2:
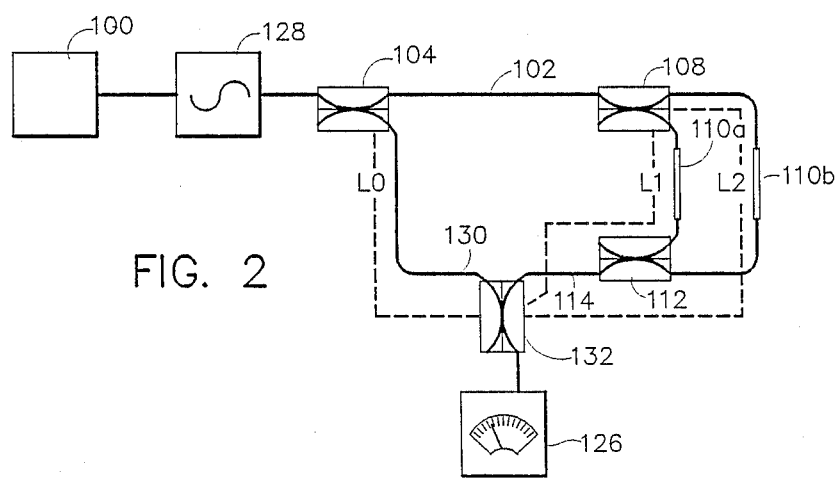
FIG. 2 is a schematic drawing of one preferred embodiment of a distributed fiber-optic sensor system of the present invention.

The sensor system illustrated in FIG. 2 comprises a modification of the system of FIG. 1, wherein the number of detectors required for sensor monitoring is reduced to 1 and wherein the requirement of a line having a path length matched to that of a sensor path is removed entirely. Before discussing the structure and operation of the system of FIG. 2 in detail, it will be helpful to address some basic information.

It is well-known in the optics technology that the magnitude of the complex degree of coherence (hereinafter referred to as the coherence function) of a given optical signal is the magnitude of the Fourier transform of that signal's optical power spectral density. An example of this is that the coherence function of a set of evenly spaced frequencies is a periodic function. For example, a set of frequencies spaced by a given frequency f and starting off with some specified relationships, will return to those phase relationships every length $L=c/f$, where c is the speed of light in the material used. Consequently, an optical signal composed of such a set of lines could be used to probe interferometers with path length differences L1, L2, L3, etc. But very little signal intensity would be detected from interferometers with path length differences significantly dissimilar from these values. The term interferometer is used to describe a structure providing two optical paths which coincide at the optical source and at a detector, but which are separate along some portion of their lengths.

A major problem in implementing such a technique is the production of a suitable optical source. For example, a normal gas laser may provide several optical lines or frequencies which are evenly spaced, but it is difficult to change the optical signal spacing and thus gain control of a selected interferometer which one wishes to monitor.

In the system of FIG. 2, a single line laser is used as the light source 100, with its output signal passing through a high speed modulator 128, such as a phase modulator. Operation of the modulator 128 with a periodic driving signal will put a set of side bands on the laser output. To detect the environmental effect on a sensing arm such as 110a of the interferometer, one simply tunes the frequency (f) of the phase modulator 128 to c/L. This signal is separated in coupler 104 as described previously, with one portion of the signal traveling on a fiber-optic reference bus 130 to a directional coupler where it is combined with the optical signal from return bus 114.

The two signals combined in coupler 132 will mix coherently upon appropriate modulation from the modulator 128, and the signals will produce a voltage modulation at the detector 126. This modulation is representative of the environmental factors influencing the monitored sensor 110.

The detector 126 has a low pass filter (not shown) attached to it. In typical operations, the modulator 128 is running at frequencies in excess of 1 MHz, but frequencies below 100 kHz are intended to be detected. Accordingly, the low pass filter permits passage of signals in the band to be monitored, with the band which is passed through the filter being sufficiently narrow to lie in the band between side band frequencies, and thereby avoid any confusion by the presence of a side band frequency in the detected frequency band.

In the system of FIG. 2, there are actually three different interferometers formed as a result of combining the various light paths. Particularly, the system of FIG. 2 provides light paths between coupler 104 and coupler 132 which are designated by dashed lines as L0, L1, and L2. The interferometers defined in the system comprise the optical path length differences defined by the relationships of L1−L0; L2−L0; and L2−L1.

The ability to isolate the output signal from coupler 132 corresponding to a selected one of the above-indicated inteferometers depends on the relative path length differences of the interferometers. However, this isolation capability also depends on the number of evenly spaced frequencies that are present in the optical signal. If only two frequencies make up the optical signal, then the coherence function is sinusoidal and only small regions exist where no signal is detected. Those small regions define what the optical path length difference needs to be in the non-selected interferometers in order to detect a signal only from the selected interferometer. However, as the number of evenly-spaced frequencies making up the signal is increased, the coherence function defines a wave form which has high sensitivity over a relatively narrow region of delay, and provides a much broader delay region of low sensitivity into which the path length differences of the other interferometers could fit. Thus, the use of additional frequencies in the system of FIG. 2 would result in greater sensitivity and increased ability to monitor a single selected sensor.

Figure 3:
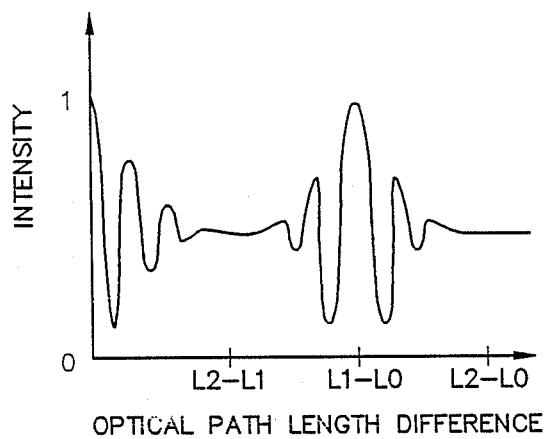
FIG. 3 is a graphical representation of the optical signal seen at the detector of FIG. 2, as a function of the optical path length difference in the interferometers of FIG. 2.

Referring now to FIG. 3, a representation of the signal intensity monitored at detector 126 is illustrated as a function of the optical path length difference. In this particular illustration, the modulator 128 is providing side band frequencies to create optical coherence at a path length corresponding to the optical path length difference of the interferometer defined by the paths L1−L0. However, the signal is not coherent for the interferometer defined by paths L2−L1, nor is it coherent for the interferometer defined by path L2−L0. Accordingly, the signal intensity monitored in detector 126 comprises a representation of the environmental influence on the sensor 110a in the system of FIG. 2, and does not include effects of environmental influences experienced by the other sensor 110b.

Figure 4:
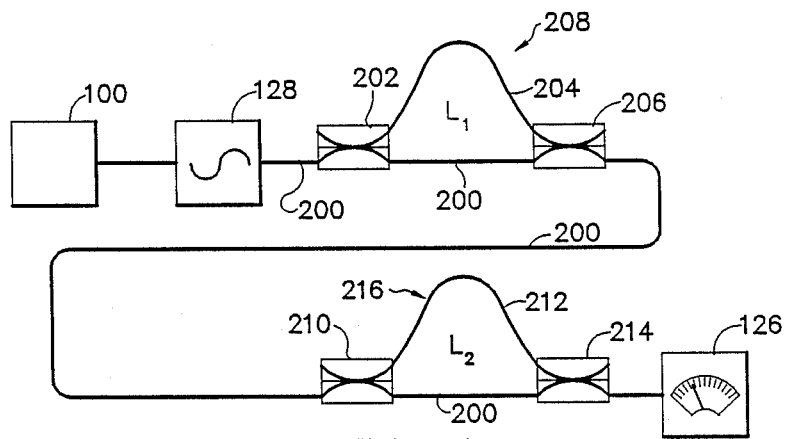
FIG. 4 is a schematic drawing of another preferred embodiment of a sensor array system in a series configuration.

Referring now to FIG. 4, another configuration of the sensor array system of the present invention can be described. In particular, the system of FIG. 4 comprises a series configuration wherein the light source 100 provides an optical signal through a modulator 128 onto an optical fiber 200. A portion of the optical signal is coupled from fiber 200 in an optical coupler 202 onto an optical fiber segment 204, with the optical signal being again coupled into fiber 200 via another optical coupler 206. This configuration of couplers 202 and 206 on fiber 200, along with the connecting fiber segment 204, define a Mach Zehnder interferometer generally indicated at 208, having an optical path length difference of length L1.

At least a portion of the optical signal from fiber 200 is coupled via another optical coupler 210 into another optical fiber segment 212 and then back into the fiber 200 via an optical coupler 214. This combination of couplers 210 and 214 on the fiber 200, along with the optical fiber segment 212 define another Mach Zehnder interferometer, generally indicated at 216, having an optical path length difference of length L2. Following coupler 214, optical fiber 200 is connected to a detector 126 which detects the intensity of the optical output signal received from line 200, which is a indication of the environmental influence on the sensor of the selected interferometer.

The system of FIG. 4 contains two interferometers which are of particular interest, those being interferometers 208 and 216. However, there are four different optical paths present in this system. These are: (1) the path defined from coupler 202 to coupler 214 through optical fiber 200; (2) the path defined through optical fiber segment 204 in interferometer 208, and in fiber 200 through interferometer 216; (3) the optical path through fiber 200 in interferometer 208, and through optical fiber segment 212 in interferometer 216; and (4) the path through optical fiber segments 204 and 212. The differences between these various paths form a total of six interferometers, but because of the system configuration, there are just four different path length difference values present in the system. Thus, the coherence function necessary to permit monitoring of either of the two interferometers 208 or 216 which are to be monitored must be defined so as to provide for optical coherence at optical path length differences of either L1 or L2, while not providing for optical coherence at the other optical path difference values in the system.

Based on the above it will be appreciated that as interferometers are added to the system, the number of optical path length differences which must be essentially ignored by the output intensity in identifying the selected interferometer increases rapidly. A method for designing systems with having plural interferometers is described hereafter.

Figure 5:
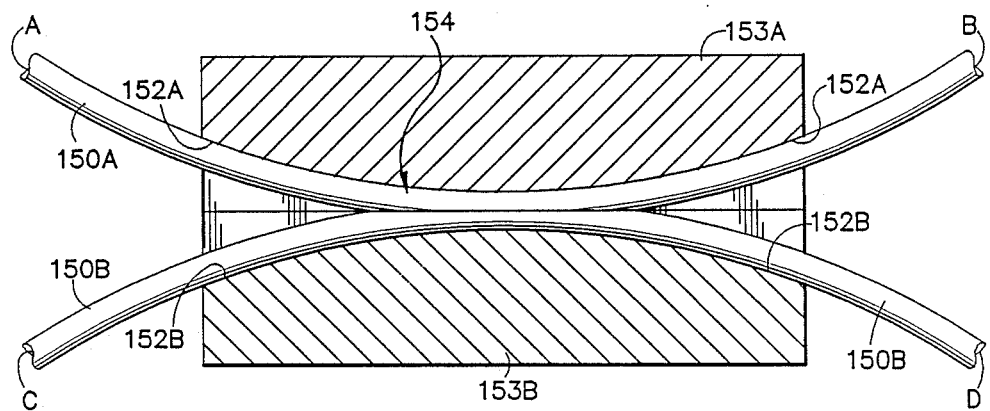
FIG. 5 is a sectional view of one embodiment of a fiber-optic directional coupler for use in the sensor array system of the present invention.

With respect to the coupling of light signals in the present invention, a more detailed description of a preferred fiber-optic directional coupler which may comprise couplers 104, 108, and 112, for example, may be provided by reference to FIG. 5. Specifically, this coupler comprises two optical fiber strands labeled 150a and 150b, formed of a single mode fiber-optic material having a portion of the cladding removed from one side thereof. The two strands 150a and 150b are mounted in respective arcuate slots 152a and 152b, formed n respective blocks 153a and 153b. The strands 150a and 150b are positioned with the portions of the strands where the cladding has been removed in close-spaced relationship, to form a region of interaction 154 in which the light is transferred between the core portions of the strands. The amount of material removed is such that the core portion of each strand 150a and 150b is within the evanescent field of the other. The center-to-center spacing between the strands at the center of the coupler is typically less than above 2 to 3 cores diameters.

It is important to note that the light transferred between the strands at the region of interaction 154 is directional. That is, substantially all of the light applied to input port A is delivered to the output ports B and D without contra-directional coupling to port C. Likewise, substantially all of the light applied to input port C is delivered to the output ports B and D. Further, this directivity is symmetrical. Thus, light supplied to either input port B or input port D is delivered to the output ports A and C. Moreover, the coupler is essentially nondiscriminatory with respect to polarizations, and thus preserves the polarization of the coupled light. Thus, for example, if a light beam having a vertical polarization is input to port A, the light coupled from port A to port D, as well as the light passing straight through from port A to port B, will remain vertically polarized.

From the foregoing, it can be seen that the coupler may function as a beam splitter to divide the applied light into two optical paths, as is accomplished by coupler 104 of FIG. 1.

In the embodiment shown in FIG. 5, the coupler has a coupling efficiency which may be varied based on the positioning of the fibers with respect to each other. As used herein, the term "coupling efficiency" is defined as the power ratio of the coupled power to the total output power, expressed as a percent. For example, referring to FIG. 5, if light is applied to port A, the coupling efficiency would be equal to the ratio of the power at port D to the sum of the power output at ports B and D.

The systems illustrated in FIGS. 2 and 4 generally illustrate a basic multiplexed system. However, before discussing the operation and design of multiplexed systems in more detail, it may be advantageous to further describe the underlying function and operation of the systems by reference to a single interferometric sensor. Such a system would be formed by removing the sensor 110b of the system in FIG. 1, or removing the interferometer 216 in the system of FIG. 4. In this case, a single Mach Zehnder interferometer is formed with a path imbalance, $\tau$, between the two arms of the interferometer. Also assume that the optical signal communicated into the interferometer is composed of two frequencies spaced a distance of 2f apart. In this situation, the intensity of the light reaching a detector 126 at the interferometer output is given by the following relationship:

$$I_{det} = \frac{I_0}{2}(1 + \cos(2\pi\tau\nu_0)\cos(2\pi\tau f)) \qquad \text{Equation 1}$$

where $\nu_0$ is the center optical frequency (assuming 50/50 optical splitting, no loss, perfect polarization overlap, and low pass filtering to eliminate the beat signal at the frequency 2f); and where $I_0$ is the initial power injected into the system, discounting losses.

Considering the relationship set forth in Equation 1, it is apparent that the two optical frequencies in the interferometer create an envelope over the conventional monochromatic result $(1+\cos 2\pi\tau\nu_0)$. Due to this envelope, the interferometer output only has a high fringe visibility when the condition $2\tau f=n$ (where n is an integer) is met. The interferometer output has no fringe visibility when $2\tau f=(n+\frac{1}{2})$. Accordingly, by varying the frequency spacing of the two optical frequencies, the interferometric sensor can be effectively turned on and off by changing the fringe visibility for a fixed path imbalance, $\tau$.

FIG. 6 illustrates one preferred embodiment of a system of the present invention which was constructed and which demonstrates this on/off effect. In particular, the system of FIG. 6 comprises a synthesizer 300 such as Hewlett Packard Model 8656B which is operated at a selected frequency f. The output of synthesizer 300 is connected to a mixer 302 comprising, for example, a Watkins Johnson M1. Also connected to the mixer 302 is the output of an oscillator 304 which, for purposes of evaluation in the system of FIG. 6 was set at 80 MHz.

The signals received from oscillator 304 and synthesize 300 are mixed in the mixer 302 to form an electrical signal comprised of two frequencies. One of the frequencies is at (80 +f) MHz, and the other is at (80−f) MHz. This electrical signal is communicated from the mixer 302 to an attenuator 306 which forms the signal so that it will be not too large when subsequently amplified. The signal from attenuator 306 is then passed to a power amplifier 308, which in the system of FIG. 6, comprises a commercially available power amplifier such as an ENI 300L device. Power amplifier 308 boosts the signal from the attenuator 306, and transmits it to an acousto-optic cell 310.

The ocousto-optic cell 310 also receives an optical signal from a light source 312 which, in the illustrated embodiment, is a single frequency laser such as a Tropel brand HeNe laser, identified as a Tropal Model 200. The electrical signal from the power amplifier 308 is mixed in the acousto-optical cell 310 with the output of the light source 312, to obtain an optical signal composed of two frequencies which are spaced by the amount of 2f. The optical signal from the acousto-optic cell 310 is launched via a lens 314, or other conventional means, into a first end of an optical fiber 316.

A pair of optical couplers 318 and 320 are secured at selected locations on the optical fiber 316 to define the fiber segment 316a between couplers 318 and 320 as one arm of a Mach Zehnder interferometer generally indicated at 322. The other arm of interferometer 322 comprises a segment of optical fiber 324 which is secured at a first end by coupler 318 in coupling relationship with optical fiber 316. A second end of the optical fiber 324 is secured within optical coupler 320 so as to be in coupling relationship to the optical fiber 316.

A polarization controller 326 is included in the fiber segment 316. Polarization controller 326 functions to maintain the appropriate polarization relationship of the optical signals passing therethrough. One preferred embodiment of a polarization controller for use with the present invention is described subsequently herein.

For purposes of demonstration, a piezoelectric (PZT) cylinder 328 was used in the optical fiber 324 to phase modulate the light within that optical fiber, in order to simulate an environmental signal. PZT cylinder 328 was connected to the output of an oscillator 330 which generated the excitation signals in the PZT cylinder 328 producing the simulated environmental signal.

In the particular embodiment which was constructed, the arms of the interferometer 322 were configured so as to define a path length difference or imbalance ($\tau$) of 400 meters. This converts to a time delay of $\tau=2$ microseconds. The optical couplers 318 and 320 comprise polished evanescent field tunable couplers which are used to compensate for different losses in the two arms.

The output from the interferometer 322 is communicated to a detector 332 which in one preferred embodiment comprises a conventional PIN photodiode, such as one manufactured by Hewlett Packard and identified as part number HP4207. Another preferred device which can comprise detector 332 is a conventional avalanche photodiode. The signal from detector 332 was then communicated to an amplifier 334 comprising a conventional amplifier for boosting the detector signal, such as a Miteq, part number AU-3A-0110. This amplified signal is then passed to an oscilloscope or spectrum analyzer for purposes of analysis. In the illustrated embodiment, a Tektronix 7L5 system was used as the spectrum analyzer 336.

Figure 7A:
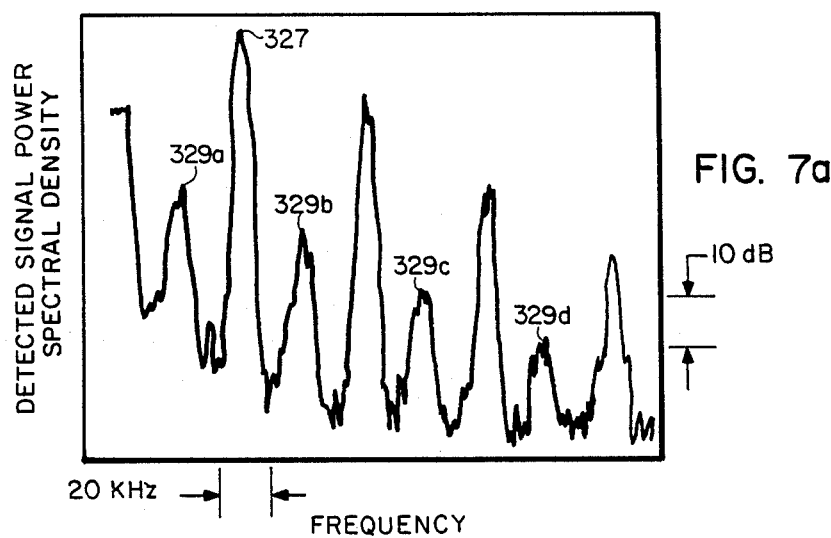
FIG. 7(a) is a graphical representation of the spectrum of the optical output signal as seen in the spectrum analyzer of the system of FIG. 6, wherein the optical input spectrum is composed of two frequencies spaced by 1 MHz.

FIG. 7 graphically illustrates the output signal which was monitored in detector 332 of the embodiment of FIG. 6, for two different frequency spacings. The frequency and dB scales of the graphs of FIG. 7 are indicated on the horizontal and vertical axes, respectively, of those graphs. In particular, FIG. 7(a) illustrates the output signal detected when the synthesizer 300 is operating at a frequency f=0.5 MHz ($2f\tau=2$). In this condition, the fringe visibility is high and the highest side band 327 produced by phase modulation through PZT cylinder 328, driven at 50 kHZ, is 65 dB above the noise floor. The peaks 329a through 329d which occur at multiples of 22 kHz are believed to be due to the fluctuations in the Tropel laser power supply leading to frequency fluctuations in the laser output.

Figure 7B:
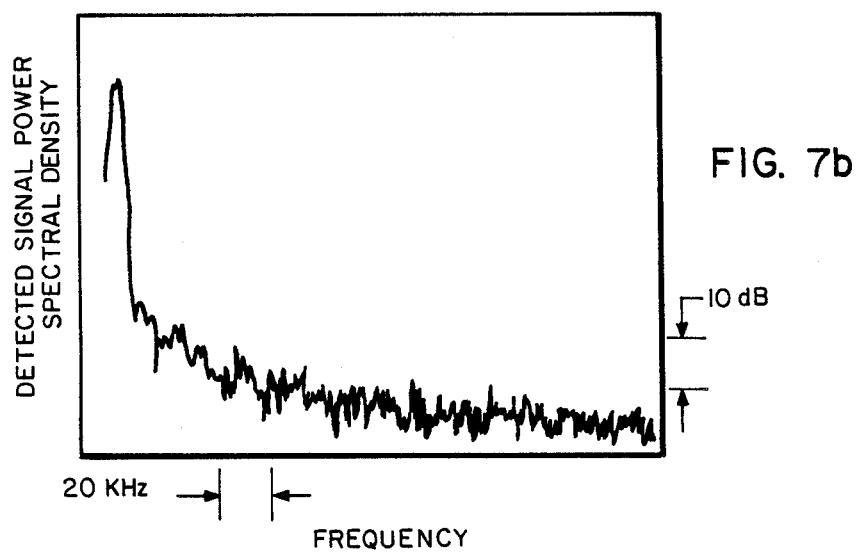
FIG. 7(b) is a graphical representation of the spectrum of the optical output as seen in the spectrum analyzer of the system of FIG. 6, for an optical input spectrum composed of two frequencies spaced by 1.25 MHz.

FIG. 7(b) illustrates the output signal detected after the synthesizer 300 is scanned up to 1.25 MHz ($2f\tau=2.5$). In this situation, the phase modulation side bands fall off dramatically, leaving just the noise floor.

Thus, between the two conditions illustrated in FIG. 7(a) and 7(b), it becomes apparent that a 40–50 dB change in sensitivity was readily achieved and was stable. Sensitivity changes of as much as 70 dB were observed, but careful alignment of the input fiber was necessary in order to launch equal amounts of the two optical frequencies. The results produced by this system illustrate that it is possible to effectively turn an interferometric sensor off and on by up to 70 dB by simply changing the frequency spacing between the optical source lines.

One type of polarization controller 326 suitable for use in the sensor system of the present invention, such as in the embodiment of FIG. 6, is illustrated in FIG. 8. The controller includes a base 370 on which a plurality of upright blocks 372a through 372d are mounted. Between adjacent ones of the blocks 372, spools 374a through 374c are tangentially mounted on shafts 376a through 376c, respectively. The shafts 376 are axially aligned with each other and are rotatably mounted between the blocks 372. The spools 374 are generally cylindrical and are positioned tangentially to the shafts 376.

A segment of optical fiber 316 extends through axial bores in the shafts 376 and is wrapped about each of the spools 374 to form three coils 378a through 378c. The radii of the coils 378 are such that the fiber 316 is stressed to form a birefringent medium in each of the coils 378. The three coils 378a through 378c may be rotated independently of each other about the axis of the shafts 374a through 374c, respectively, to adjust the birefringence of the fiber 316 and, thus to control the polarization of the light passing through the fiber 316.

The diameter and number of turns in the coils 378 are such that the outer coils 378a and 378c provide a spatial delay of one-quarter wave length, while the central coil 378b provides a spatial delay of one-half wave length. The quarter wave length coils 378a and 378c control the ellipticity of the polarization, and the half wave length coil 378b controls the direction of polarization. This provides a full range of adjustment of the polarization of the light propagating through the fiber 316.

It will be understood, however, that the polarization controller may be modifed to provide only the two quarter wave coils 378a and 378c, since the direction of polarization (otherwise provided by the central coil 378b) may be controlled indirectly through proper adjustment of the ellipticity of polarization by means of the two quarter wave coils 378a and 378c. Accordingly, the polarization controller 326 is shown in FIG. 6 as including only the two quarter wave coils 378a and 378c. Since this configuration reduces the overall size of the controller 326, it may be advantageous for certain applications of the present invention involving space limitations.

Thus, the polarization controller 326 provides means for establishing, maintaining and controlling the polarization of the light within the optical fiber segment 316a in the interferometer 322.

The single sensor technique described above can be generalized in order to monitor or "turn on" a single interferometric sensor in an array of interferometers while not monitoring or "turning off" the rest of the interferometers. As was indicated previously, this is accomplished by generating a coherence function which is approximately equal to 0 for all path length delays corresponding to interferometers not to be monitored, but which is approximately equal to 1 or at its maximum for the delay corresponding to the interferometer which is to be monitored.

The form of the coherence function which is of particular interest in the embodiment of the present invention is the complex degree of coherence, since its magnitude defines the coherence function which represents the degree of coherence of the optical signals based upon distance. The complex degree of coherence is defined in Joseph W. Goodman, Statistical Optics, Section 5.1.2, p. 192, (John Wiley & Sons, 1985). This text is hereby incorporated herein by reference.

The coherence function of an optical signal and its power spectrum form a Fourier transform pair. Mathematically the coherence function can be described as follows:

$$\gamma\left(\frac{\Delta l}{c}\right) = \left| \int_0^{+\infty} G(\nu) e^{-2\pi i \nu \Delta l/c} d(\nu) \right| \qquad \text{Equation 2}$$

where
$\gamma(\Delta l/c)$ is the coherence function;
$\Delta l$ is the optical path length difference;
$c$ is the speed of light;
$\nu$ is the frequency; and
$G(\nu)$ is the single-side optical power spectral density, also referred to as the power spectrum.

Likewise, the power spectrum can be described mathematically as follows:

$$G(\nu) = \int_{-\infty}^{+\infty} \gamma\left(\frac{\Delta l}{c}\right) \left[ \left(e^{i\phi(\frac{\Delta l}{c})}\right)\left(e^{2\pi i \nu \Delta l/c}\right) \right] d\left(\frac{\Delta l}{c}\right) \qquad \text{Equation 3}$$

where $\phi(\Delta l/c)$ is a phase term representing the phase of the complex degree of coherence. It is noted that operation of the system of the present invention is not dependent upon the value of $\phi$. Therefore, $\phi$ may be chosen in whatever manner is convenient to produce a $G(\nu)$ which is easily producible physically.

Because the coherence function and its power spectrum form a Fourier transform pair, if the power spectrum comprises a set of evenly spaced frequencies, then the coherence function will be periodic, beginning at a value of 1 for a 0 path imbalance, and returning to the value of 1 periodically, at significant path imbalances. It is this feature which permits use of the coherence function for monitoring selected interferometers in a sensor array system. More specifically, use is made of the coherence function by designing and operating the system so that the value of the coherence function is at or close to its minimum for those path length differences corresponding to the path length differences of interferometers not to be monitored. However, the system is also designed so that the coherence function is substantially at its maximum for the optical path length difference of the interferometer which is to be monitored. The value of the coherence function for path length differences which are not similar to those of any interferometers in the system does not need to be taken into consideration in the design, since the output signal will not reflect any changes which impact the monitoring of interferometers in the system.

It is noted that phase relationships between optical power frequency components do not affect the optical power spectral density and, hence, do not affect the related coherence function. Accordingly, those optical frequency components may be generated by any of many different means, such as periodic phase, frequency or amplitude modulation (or some combination of these) of a single optical frequency. Also, the power spectrum frequencies may be formed by the phase of the electrical signal in a nonlinear linear modulator, which will affect the magnitude of the side bands, or the side bands may be formed by use of a wide band optical source which is not monochromatic and which, therefore, provides several frequencies for use in forming the power spectrum.

In practice, the present invention is implemented by first determining all of the interferometric path imbalances in the sensor array, including those imbalances corresponding to "cross terms." Cross terms comprise optical path imbalances which arise due to system configuration or to interferometers not to be monitored. For example, referring again in FIG. 4, it will be appreciated that the optical path imbalances relating to interferometers to be monitored comprise the imbalances designated at L1 in interferometer 208, and at L2 in interferometer 216. However, there is also an optical path imbalance defined by light which travels from coupler 202 to coupler 214 through optical fiber 204 and 212, as compared with light which travels between couplers 202 and 214 entirely within optical fiber 200. This optical path length difference does not correspond to the difference in one of the interferometers 208 or 216, and thus comprises a "cross term." Of course, it is necessary that the coherence function be substantially at its minimum for such cross terms, as well as for the path imbalances of interferometers not to be monitored, so that the monitoring of the selected interferometer can be accomplished.

After determining all of the interferometric path imbalances in the array, coherence functions can then be approximated to define a minimum or substantially 0 value at path delays corresponding to all but a selected interferometer. One coherence function is approximated for each different interferometer to be monitored. Each of these coherence functions corresponds to a power spectrum which is to be generated in the optical signal, to create the appropriate system response.

In the preferred embodiment, the power spectra are generated by modulation of the input optical signal. Thus, the power spectrum associated with each coherence function can be defined by a modulation function which indicate the modulation to be applied to the input optical signal in order to create the desired power spectrum. For the set of coherence functions associated with a given sensor array, a set of modulation functions are created to define the necessary power spectra. This set of modulation functions are preferably recorded or stored in a memory of a system, such as in a control system, so as to be available for use. When a particular sensor is to be monitored, the necessary modulation function is applied to the output of an optical source, such as a single frequency or monochromatic source. This action results in formation of the appropriate power spectrum which thereby synthesizes the desired coherence function, so that only the selected sensor is monitored.

More specifically, the method of using the system of the present invention comprises first determining all of the interferometric path imbalances in the array, and then identifying all distances which correspond to the optical path length differences or imbalances in the array which are not to be monitored. These distances define where it is desired that the coherence function $\gamma$ equal 0 in monitoring the sensor of a selected interferometer. Preferably, the above information is plotted on a graph or similar representation which can be used for designing a preferred wave form configuration for the coherence function.

After determining where the coherence function is to be 0, the location or locations where the coherence function ($\gamma$) is to be at its maximum value which should be substantially 1, is also determined, and indicated on the plot. A Fourier transform of the coherence function is then taken to define a power spectrum which will provide the desired coherence function.

If possible, a circuit is designed to produce the resulting power spectrum. However, if the resulting power spectrum is quite complicated, a less complex circuit may be developed which produces a power spectrum looking somewhat similar to the desired power spectrum. This circuit should include some adjustable parameters. For example, if the circuit is built out of synthesizers, the synthesizer should permit adjustment of frequency, phase, and intensities of the various synthesized signals. After designing the circuit which will create the power spectrum, the user determines the coherence function associated with the new, less complex circuit. It is not necessary that the coherence function resulting from use of the new circuit look precisely the same as the desired coherence function, so long as the coherence function is substantially at its minimum or 0 in the appropriate places, were is at or near its maximum at those locations which are previously defined.

If the desired coherence function is not achieved by the circuit as designed, the user adjusts the parameters in the circuit, and then again examines the relating coherence function. This bracketing procedure is used as necessary until a desired coherence function is achieved. The information necessary for creating the power spectrum for this coherence function is then recorded, and maintained as the modulation function which is to be applied to the system in order to monitor the sensor of the selected interferometer.

In a special case of the technique of the present invention, all of the optical frequencies can be designed to be in phase at a given point in time. The time domain signal which results in this situation is pulsed, in a manner similar to a mode locked laser output. Each pulse is coherent with the other pulses. By changing the frequency spacing of the signals, the time delay between the pulses will be changed. Accordingly, this time domain signal could then be launched into an interferometric array with the pulse delay set equal to the path delay of the interferometer to be monitored. For the other interferometers, the two emerging pulse streams would not overlap and no signal would be produced.

Figure 9:
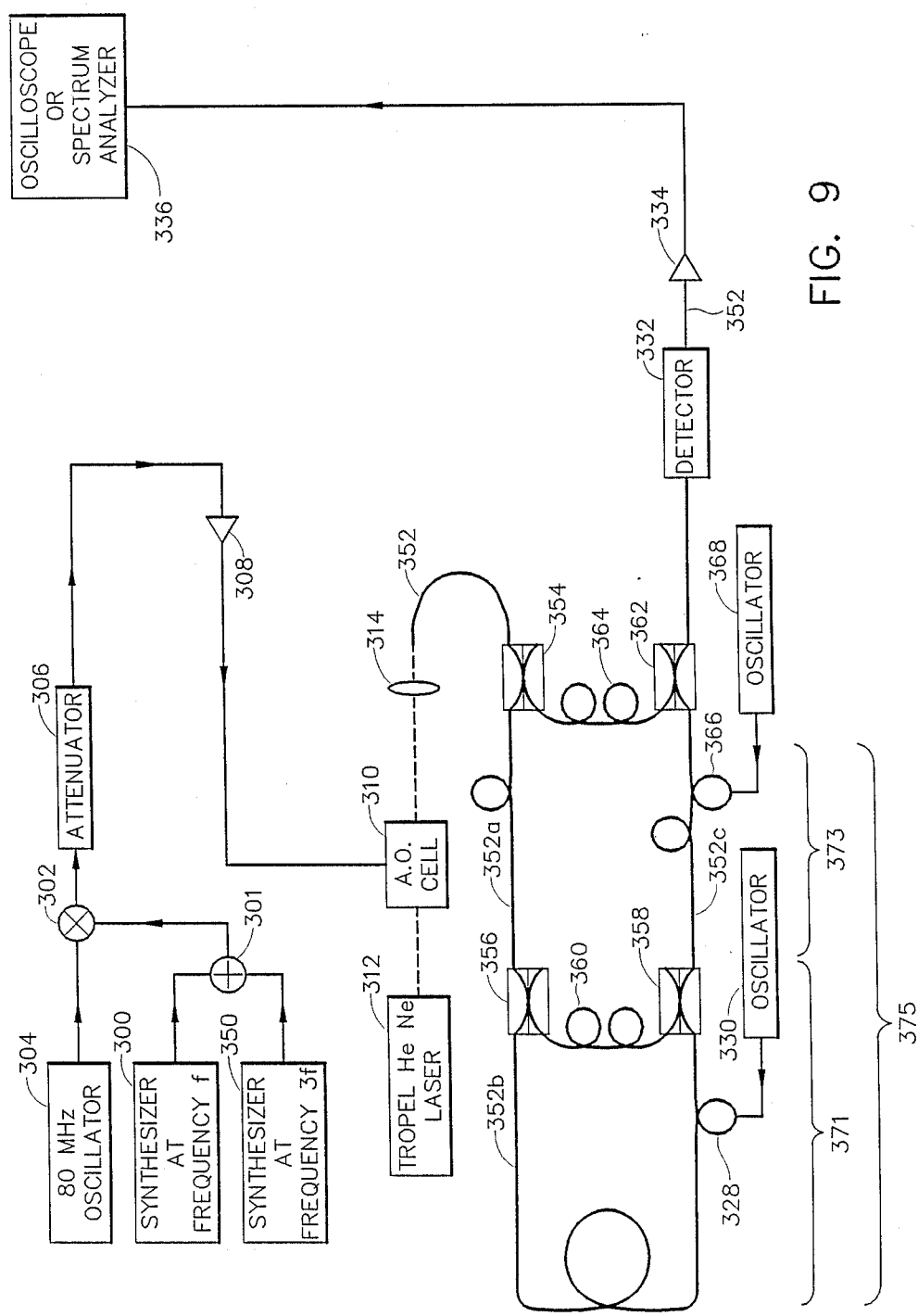
FIG. 9 is a schematic drawing of another preferred embodiment of a sensor array system of the present invention, incorporating three interferometers.

FIG. 9 illustrates one preferred embodiment of a sensor array which includes several interferometers, and comprises an expanded version of the system of FIG. 6. The system of FIG. 9 was constructed to demonstrate the above-described multi-interferometer multiplexing technique.

Specifically, the system includes a first synthesizer 300 which is operated at a first frequency f. The output of the first synthesizer 300 is combined at 301 with the output of a second synthesizer 350 which is operated at a frequency of 3f. Preferably, the frequency synthesizers 300 and 350 are phase-locked with respect to each other. Synthesizer 350 may be selected from one of numerous commercially available synthesizers, and preferably comprises a synthesizer manufactured by Hewlett Packard and designated as Model No. HP3325A.

The combined output of synthesizers 300 and 350 is provided to a mixer 302, where it is mixed with the output of an oscillator 304. For purposes of example, the oscillator of this system was operated at a frequency of 80 MHz. The mixing of the combined synthesizer signals with the oscillator signal in mixer 302 produces an electrical signal comprised of four frequencies which are spaced from each other by 2f.

The output from mixer 302 is communicated to an attenuator 306 which places the signal in appropriate form for amplification. The signal is then communicated from attenuator 306 to power amplifier 308, where it is boosted and then transmitted to an acousto-optic cell 310. Acousto-optic cell 310 preferably comprises any of numerous commercially available Bragg cells, such as an Intra-Action AOM-80.

Acousto-optic cell 310 is also connected to the output of a light source 312 such as a HeNe laser. The optical signal from light source 312 interacts in acousto-optic cell 310 with the electrical signal received from power amplifier 308 to produce an optical signal composed of four frequencies which are spaced from each other by 2f.

The optical signal from acousto-optic cell 310 is communicated through a lens or other focusing means 314 into a first end of an optical fiber 352. Optical fiber 352, as well as all other optical fibers forming the interferometers of the distributed array system, is preferably comprised of single-mode optical fiber. However, other types of optical carriers such as multi-mode optical fiber may also be usable, at least in specific configurations of the distributed array system.

A pair of optical couplers 354 and 356 are each secured on optical fiber 352 so as to be spaced from each other by a selected distance defined by a first segment 352a of the optical fiber 352. Another optical coupler is positioned on the optical fiber 352 at a selected distance from the optical coupler 356, which distance is defined by a second segment 352b of the optical fiber 352. Optical coupler 356 also secures a first end of an optical fiber segment 360 in optical coupling configuration with the optical fiber 352. A second end of the optical fiber segment 360 is secured in optical coupler 358 so as to be in coupling configuration with the optical fiber 352 via coupler 358.

An additional optical coupler 362 is secured on optical fiber 352 at a selected distance from optical coupler 358 defined by a third segment 352c of the optical fiber 352. Optical coupler 354 is also connected to the first end of an optical fiber segment 364, placing segment 364 in coupling configuration with optical fiber 352. The second end of optical fiber segment 364 is secured in coupler 362 so as to be in coupling configuration with the optical fiber 352 at the location of coupler 362.

For purposes of demonstration, a first PZT cylinder 328 was secured in the second fiber segment 352b for purposes of generating signals in that segment, simulating environmental influences. The PZT cylinder 328 was connected to the output of an oscillator 330 which provided the signals to drive the PZT cylinder 328. Another PZT cylinder 366 was secured in fiber segment 352c for the purpose of simulating environmental influences on that fiber. Likewise, the output of an oscillator 368 was connected to the PZT cylinder 366 to drive that cylinder.

Beyond coupler 362, the optical fiber 352 is connected to a detector 332 for monitoring signals traveling in the fiber 352. The output from the detector 332 is connected via optical fiber 352 to an amplifier 334 which boosts the signal from the detector 332, and then provides the boosted signal to an oscilloscope or spectrum analyzer 336 permitting evaluation and analysis of the output signal.

It is noted that the ladder configuration of the optical fiber sensor array illustrated in FIG. 9 defines several interferometers. In particular, optical fiber segments 352b and 360 define a first interferometer generally indicated at 371. Also, optical fiber segments 352a, 360, 352c, and 364 define a second interferometer generally indicated at 373. In addition, optical fiber segments 352a, 352b, 352c and 364 define yet a third interferometer generally indicated at 375. Accordingly, the signal transmitted from acousto-optic cell 310 via lens 314 into the fiber 352 is processed by the couplers in the system so that at least a portion of the signal passes through each of the optical paths defining the interferometers 371, 373, and 375.

In order to monitor the environmental influence on the sensors of one of the interferometers of the system illustrated in FIG. 9, it is necessary to adjust the coherence functions in a mannr such as was described above to minimize the value of the coherence function at those signal lengths corresponding to the path length differences of interferometers which are not to be monitored. Likewise, the coherence function should be designed to be at its maximum at the signal length corresponding to the path length difference of the particular interferometer which is to be monitored. The method described above for designing the system was used in connection with a system configured as illustrated in FIG. 9, to construct one embodiment of the invention for demonstration purposes.

In the demonstration system constructed to correspond to the system of FIG. 9, the optical fiber lengths were selected to define optical path imbalances of 400 meters for interferometer 371; 123 meters for interferometer 373; and 523 meters for interferometer 375. These path imbalances correspond to time imbalances of 2 microseconds, 0.615 microseconds, and 2.615 microseconds, respectively. The PZT cylinder 328 defining a phase modulator was driven by oscillator 330 at a frequency of 120 kHz, while the PZT cylinder 366 was driven by oscillator 368 at a frequency of 180 kHz.

In operating the demonstration system, it was observed that for small electrical signals to the acousto-optic cell 310, the resulting optical signal transmitted from cell 310 was composed primarily of four frequencies. However, for larger electrical signals, the acousto-optic cell 310 responded non-linearly, creating additional optical side bands. Upon varying the phase relationship between the synthesizers 300 and 350, the peak voltage to the acousto-optic cell 310 changed, modifying the effect of the non-linearity, and consequently the magnitude of the optical side bands produced. Accordingly, it is noted that the optical power spectrum and the corresponding coherence function are dependent not only upon the frequency f, but also upon the relative phase of the two synthesizers 300 and 350. This is generally desirable, since it provides another degree of freedom for producing optical side bands defining the power spectrum to be formed in creating the required coherence functions.

Figure 10A:
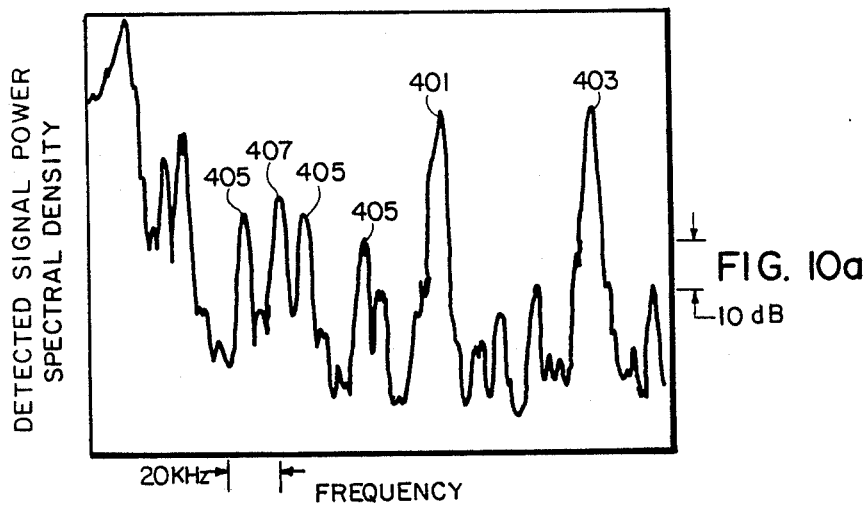
FIG. 10(a) is a graphical representation of the spectrum of the output of the system illustrated in FIG. 9, where the frequency synthesizers are turned off.

The frequency domain output signals produced by the demonstration system of FIG. 9 are graphically illustrated in FIG. 10. The frequency and dB scales of the graphs of FIG. 10 are indicated on the horizontal and vertical axes, respectively, of those graphs. In particular, FIG. 10(a) illustrates the system output in the frequency domain when the synthesizers 300 and 350 are not operating. It is noted that in addition to the 120 kHz, 180 kHz, and 22 kHz (laser noise) expected side bands (401, 403 and 405, respectively), there is also a 60 kHz peak 407 corresponding to a phase modulation cross term produced by the interferometer 375.

Figure 10B:
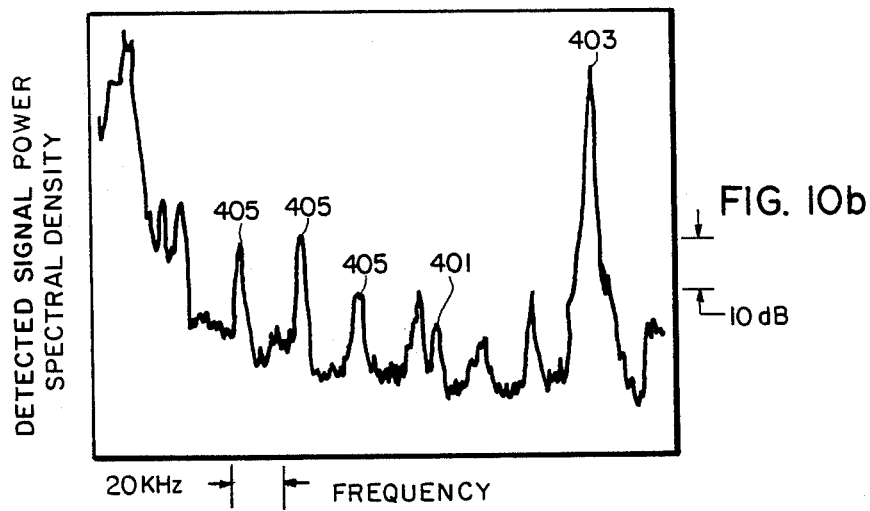
FIG. 10(b) is a graphical representation of the spectrum of the output of the system illustrated in FIG. 9, where the synthesizer frequency f is set at 0.86 MHz.

In FIG. 10(b), the synthesizer frequency f was selected to be 0.86 MHz. After tuning the phase between the synthesizers 300 and 350, the 120 kHz peak 401 was reduced by 40 dB, and the 60 kHz peak was lost in the noise, while the 180 kHz peak 403 remained strong, demonstrating that only interferometer 373 was being monitored.

Figure 10C:
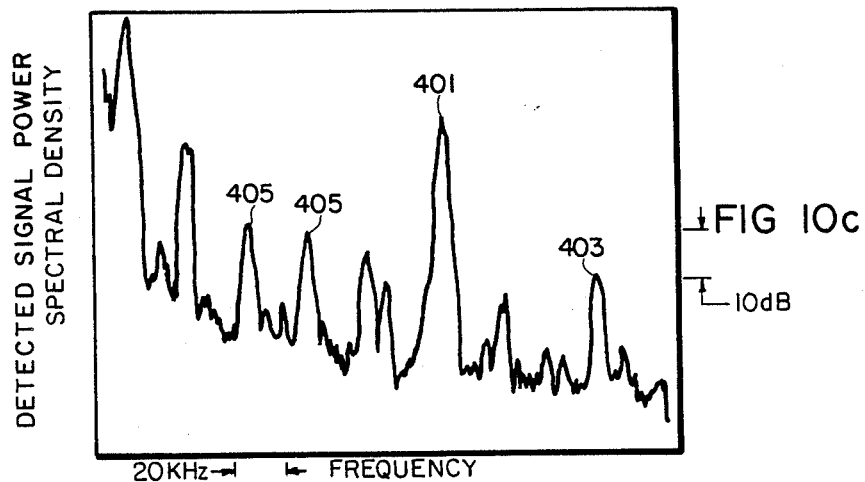
FIG. 10(c) is a graphical representation of the spectrum of the output of the system illustrated in FIG. 9, where the synthesizer frequency f is set to 0.5 MHz.

FIG. 10(c) illustrates the situation when interferometer 371 was being monitored. In this situation, the synthesizer frequency, f, was set to 0.5 MHz, resulting in a 30 dB reduction in the 180 kHz signal 403, the disappearance of the 60 kHz signal 407, and the return of the 120 kHz signal 401.

It is noted that by adding another rung in the ladder configuration of FIG. 9, one would create 6 different optical paths. Thus, it would be necessary to design the system so that the coherence function would be minimized for the imbalances relating to 5 of the path length differences, while being maximized at the path length difference of the interferometer which is to be monitored. The design technique described earlier would be used to develop the necessary coherence functions for these and other even more complex systems. Of course, as the number of interferometers increase, the ability to generate additional side bands in order to create the appropriate power spectra also increases.

The necessary degrees of freedom for creating optical side bands can be produced in designing for more complex systems by adding additional frequency synthesizers, or by utilizing other circuit features which create those optical side bands, such as the response of the non-linear acousto-optic cell to electric signals. Another preferable option for generating these additional side bands may be to use a high speed, low voltage phase modulator such as an integrated optic device, allowing greater flexibility in optical side band creation, as well as shorter fiber lengths. Still another option may be to frequency/amplitude modulate a single-mode diode laser by varying the injection current, though the non-negligible bandwidth of these sources will lead to an increased noise floor resulting from the path imbalances used.

From the above discussion, it will be appreciated that the present invention comprises a significant improvement over the prior art by providing a system and technique for selecting and monitoring individual sensors in a distributed array of sensors. The system provides a means by which selected sensors may be monitored to the exclusion of others by simple adjustment of parameters affecting the optical side bands in optical signals of the system. Thus, the output signal contains only environmental information produced by the selected sensor. This removes the need for complex equipment to process the output signal and segregate desired environmental information from information produced by other sensors. By removing the requirement for complex output signal detection and monitoring equipment, the reliability of the sensor system is enhanced, while the complexity of the system and its production costs are substantially reduced.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. What is claimed and desired to be secured by United States Letters Patent is:

What is claimed is:

1. A sensor array for monitoring environmental effects on a selected sensor, comprising:
   a plurality of interferometers, with at least one interferometer incorporating a sensor segment which influences light traveling therein in response to selected environmental effects, and with each interferometer defining a particular optical path length difference;
   means for providing to said interferometers an optical signal comprising a plurality of component signals at frequencies which are spaced from one another and at magnitudes such that said optical signal defines a waveform which reaches a maximum magnitude at a periodic rate which substantially corresponds to a difference in optical signal travel time through the optical paths of the interferometer which incorporates the selected sensor; and
   means for monitoring optical signals which have passed through at least one of said interferometers, to identify the environmental influence which affected the optical signal which passed through the selected optical sensor.

2. A sensor array as defined in claim 1 wherein the waveform reaches a minimum magnitude at times defining intervals which substantially correspond with differences in optical signal travel time through the optical paths of other interferometers in the sensor array.

3. A sensor array as defined in claim 1, further comprising means for modifying characteristics of the component signals to change said optical signal waveform so that said periodic rate corresponds to a difference in optical signal travel time through another interferometer which incorporates another sensor.

4. A sensor array as defined in claim 3 wherein the means for modifying characteristics comprises an optical phase modulator.

5. A sensor array as defined in claim 3 wherein the means for modifying characteristics comprises a frequency modulator.

6. A sensor array as defined in claim 3 wherein the means for modifying characteristics comprises an amplitude modulator.

7. A sensor array as defined in claim 1 wherein the means for providing an optical signal comprises:
   a light source;
   a frequency synthesizer for producing a signal at a first selected frequency;
   an oscillator at a second selected frequency;
   means for mixing output of the oscillator and frequency synthesizer to produce a resultant signal comprised of frequencies including the second frequency plus the first frequency, and the second frequency minus the first frequency; and
   means for mixing light from the light source with the resultant signal to produce said optical signal.

8. A sensor array as defined in claim 7 wherein the resultant signal is an electrical signal and wherein the means for mixing light from the light source with the resultant signal comprises an acousto-optic cell.

9. A sensor array as defined in claim 1 wherein the means for monitoring comprises:
 a filter having an optical signal pass band which is narrower than the frequency band between said component signals; and
 means for analyzing optical signals received from the filter.

10. An apparatus for remotely sensing environmental effects on a sensor, comprising:
 a source of optical illumination for providing an optical signal comprising a plurality of component signals at optical frequencies which are spaced from one another and of magnitudes such that said optical signal defines a periodic waveform having a maximum which recurs at a selected interval;
 a plurality of optical waveguides defining plural light paths for said optical signal, wherein at least a portion of a first one of said light paths comprises a sensing region which is sensitive to an environmental effect and which influences light propagating in the sensing region in response to said environmental effect, and wherein a path length difference between said first light path and a second one of said light paths produces a difference in optical signal travel time through said first and second light paths which substantially corresponds to said selected interval; and
 means for combining optical signals from said first and second light paths.

11. An apparatus as defined in claim 10 wherein the source of optical illumination comprises:
 a light source;
 a frequency synthesizer for producing a signal at a first selected frequency;
 an oscillator at a second selected frequency;
 means for mixing output of the oscillator and frequency synthesizer to produce a resultant signal comprised of frequencies including the second frequency plus the first frequency, and the second frequency minus the first frequency; and
 means for mixing light from the light source with the resultant signal to produce said optical signal.

12. An apparatus as defined in claim 11 wherein the resultant signal is an electrical signal and wherein the means for mixing light from the light source with the resultant signal comprises an acousto-optic cell.

13. An apparatus as defined in claim 10 wherein the waveform is at a substantially minimum magnitude at recurring intervals, so as to define periods between selected minimum magnitudes which substantially correspond with differences in optical signal travel time through other of said plural light paths.

14. An apparatus as defined in claim 10 wherein the source of optical illumination comprises:
 a light source; and
 means for acting on light from the light source to produce said plurality of component signals.

15. An apparatus as defined in claim 14 wherein the means for acting on light comprises an optical signal modulation device.

16. An apparatus as defined in claim 10 wherein the means for combining optical signals comprises an optical coupler.

17. An apparatus for remotely sensing environmental effects on a sensor, comprising:
 a plurality of optical waveguides defining plural light paths, wherein at least a portion of a first of said light paths comprises a sensing region which is sensitive to an environmental effect and which influences light propagating in the sensing region in response to said environmental effect;
 means for providing an optical signal comprising a plurality of component signals at different frequencies for transmission to said plurality of optical waveguides;
 means for changing characteristics of the component signals such that the optical signal defines a periodic waveform having a maximum which recurs at a selected interval which substantially corresponds to difference in optical signal travel time through said first light path and optical signal travel time through a second of said light paths; and
 means for combining optical signals from the first and second light paths to provide an output signal comprising information representative of the environmental effect which influenced the portion of the optical signal which traveled through the first light path.

18. An apparatus as defined in claim 17 wherein the means for providing an optical signal comprises:
 a light source; and
 an optical signal modulator.

19. An apparatus as defined in claim 17 wherein the means for changing characteristics of the component signals comprises a modulation device.

20. An apparatus as defined in claim 17 wherein the means for changing characteristics define a periodic waveform having minimums which occur at times such that intervals between various minimums substantially correspond with differences other than that between said first and second light paths, in optical signal travel time through the other plural light paths, thereby preventing coherent mixing of optical signals traveling in said other plural light paths.

21. An apparatus as defined in claim 20 wherein the means for changing characteristics comprises an optical signal modulator.

22. An apparatus for remotely sensing environmental effects on a sensor, comprising:
 a plurality of optical interferometers, with at least one interferometer including a sensor segment which influences light traveling therein in response to environmental effects on the sensor segment, wherein each interferometer defines a particular optical path length difference;
 means for providing an optical signal for propagation to the plurality of optical interferometers, wherein said optical signal comprises a plurality of component signals which form a power spectrum defining an optical signal coherence function whose maximum magnitude repeats at a periodic rate which substantially corresponds to a difference in optical signal travel time through optical paths of a selected interferometer which includes a selected sensor segment; and
 means optically connected to the selected interferometer for providing an output signal comprising information representative of the environmental effect which influenced the portion of the optical signal which traveled through the selected sensor segment.

23. An apparatus as defined in claim 22 wherein the power spectrum also defines said coherence function as comprising minimum magnitudes with intervals between various minimum magnitudes substantially corresponding with differences in optical signal travel time through the non-selected optical interferometers.

24. An apparatus as defined in claim 22, further comprising means for modifying characteristics of the component signals to change the power spectrum so that said periodic rate corresponds to a difference in optical signal travel time through optical paths in another selected interferometer which includes another selected sensor segment.

25. An apparatus as defined in claim 24 wherein the means for modifying characteristics comprises an optical phase modulator.

26. An apparatus as defined in claim 24 wherein the means for modifying characteristics comprises a frequency modulator.

27. An apparatus as defined in claim 24 wherein the means for modifying characteristics comprises an amplitude modulator.

28. An apparatus as defined in claim 24 wherein the means for modifying characteristics comprise:
a frequency synthesizer; and
a mixer for mixing the output of the frequency synthesizer with the optical signal.

29. An apparatus as defined in claim 22, further comprising:
a filter for receiving said output signal, said filter having an optical signal pass band which is narrower than the frequency band between said component signals; and
means for analyzing optical signals received from the filter.

30. An apparatus for remotely detecting environmental effects on a sensor, comprising:
a plurality of optical interferometers, with at least one interferometer including a sensor segment which influences light traveling therein in response to environmental effects on the sensor segment, wherein each interferometer defines a particular optical path length difference;
a light source for providing an optical signal;
means for modulating the optical signal to form side bands of the optical signal, wherein said side bands form a power spectrum which defines a corresponding coherence function of the modulated optical signal;
means for adjusting the side bands to modify the power spectrum so as to define a coherence function of the optical signal whose maximum magnitude repeats at a periodic rate which substantially corresponds to a difference in optical signal travel time through optical paths of a selected interferometer which includes a selected sensor segment, wherein the coherence function has minimums, and wherein time periods between various of said minimums substantially correspond to the difference in optical signal travel time through each of the non-selected interferometers; and
means optically connected to the selected interferometer for providing an output signal comprising information representative of the environmental effect which influenced the portion of the optical signal which traveled through the selected sensor segment.

31. A sensor array for monitoring environmental effects on a selected sensor, comprising:
a plurality of optical interferometers, with at least one interferometer including a sensor segment which influences light traveling therein in response to environmental effects on the sensor segment, wherein each interferometer includes separate optical paths which are combined at an output and each defines a particular optical path length difference;
means for providing an optical signal so that portions of said optical signal pass through each of the plurality of optical interferometers, wherein said optical signal comprises a plurality of component signals which cooperate to define an optical signal waveform of a configuration such that coherent mixing of said portions of said optical signal occurs only at the output of a selected interferometer which includes a selected sensor segment, and only for those portions of said optical signal having passed through common optical paths prior to reaching the input of the selected interferometer and which pass through the separate optical paths of the selected interferometer, thereby providing an output signal comprising information representative of the environmental effect which influenced the portion of the optical signal which passed through the selected sensor segment.

32. A sensor array as defined in claim 31 wherein the optical signal waveform has a maximum which repeats at a selected interval which substantially corresponds to a difference in optical signal travel time through optical paths of said selected interferometer which includes said selected sensor segment.

33. A sensor array as defined in claim 31 wherein the optical signal waveform is at a minimum at times defining intervals which substantially correspond with differences in optical signal travel time through optical paths of non-selected interferometers.

34. An apparatus comprising:
an interferometer arrangement comprising at least first, second, and third optical paths which form at least first and second interferometers, said first interferometer formed by one pair of said optical paths and said second interferometer formed by another pair of said optical paths, said one pair of optical paths defining a first path length difference and said another pair of said optical paths defining a second path length difference, said first path length difference being different from said second path length difference; and
a source of optical illumination having first and second operational modes corresponding to said first and second path length differences, respectively, said first operational mode providing high coherence for light in said one pair of optical paths and low coherence for light in said another pair of optical paths, such that said light in said one pair of optical paths interferes and said light in said another pair of optical paths is prevented from interfering, said second operational mode providing low coherence for said light in said one pair of optical paths and high coherence for said light in said another pair of optical paths, such that said light in said another pair of optical paths interferes and said light in said one pair of optical paths is prevented from interfering.

35. A sensor array for monitoring environmental effects on a selected sensor, comprising:
a plurality of interferometers, with at least one interferometer incorporating a sensor segment which influences light traveling therein in response to selected environmental effects, and with each interferometer defining a particular optical path length difference;

means for providing to said interferometers an optical signal comprising a plurality of component signals at frequencies which are spaced from one another and at magnitudes such that said optical signal defines a waveform which reaches a minimum magnitude at times defining intervals which substantially correspond to differences in optical signal travel time through the optical paths of those interferometers in the sensor array which are not selected to be monitored; and means for combining optical signals which have passed through a selected interferometer which incorporates a selected sensor segment, to provide an output signal comprising information representing the environmental effect which affected the optical signal which passed through the selected sensor segment.

36. A sensor array as defined in claim 35 wherein the waveform reaches a maximum magnitude at a periodic rate which substantially corresponds to a difference in optical signal travel time through the optical paths of the selected interferometer which incorporates the selected sensor.

37. A method for remotely sensing environmental effects on a sensor in a sensor array which includes a plurality of optical waveguides defining plural light paths, wherein at least a portion of a first of said light paths comprises a sensing region which is sensitive to an environmental effect and which influences light propagating in the sensing region in response to the environmental effect, the method comprising the steps of:

providing to said plurality of optical waveguides an optical signal comprising a plurality of component signals at frequencies which are spaced from one another and of magnitudes such that said optical signal defines a periodic waveform having a maximum which recurs at a selected interval which substantially corresponds to difference in optical signal travel time through said first light path and optical signal travel time through a second of said light paths; and combining optical signals from the first and second light paths to provide an output signal comprising information representative of the environmental effect which influenced the portion of the optical signal which traveled through the first light path.

38. A method as defined in claim 37 wherein the step of providing an optical signal comprises the step of providing said signal wherein the plurality of component signals define said periodic waveform to additionally have minimums which occur at times such that intervals between various minimums substantially correspond with differences in optical signal travel time through other combinations of said plural light paths, thereby preventing coherent mixing of optical signals traveling in said other combinations of said plural light paths.

39. A method as defined in claim 37, further comprising the step of changing characteristics of the component signals to thereby change the optical signal waveform to define a maximum which recurs at a selected interval which substantially corresponds to difference in optical signal travel time through third and fourth of said light paths, while removing maximums which recur at an interval which substantially corresponds to the difference in optical signal travel time through said first and second light paths.

40. A method for remotely sensing environmental effects on a sensor in a plurality of optical interferometers, with at least one interferometer including a sensor segment which influences light traveling therein in response to environmental effects on the sensor segment, wherein each interferometer defines a particular optical path length difference, the method comprising the steps of:

providing an optical signal for propagation to the plurality of optical interferometers, wherein said optical signal comprises a plurality of component signals which form a power spectrum defining an optical signal coherence function whose maximum magnitude repeats at a periodic rate which substantially corresponds to a difference in optical signal travel time through optical paths of a selected interferometer which includes a selected sensor segment; and providing an output signal comprising information representative of the environmental effect which influenced the portion of the optical signal which traveled through the selected sensor segment.

41. A method as defined in claim 40 wherein the power spectrum also defines said coherence function to comprise minimum magnitudes with intervals between various minimum magnitudes substantially corresponding with differences in optical signal travel time through the non-selected optical interferometers.

42. A method as defined in claim 40, further comprising the step of modifying characteristics of the component signals to change the power spectrum so that said periodic rate is changed to correspond to a difference in optical signal travel time through optical paths in another selected interferometer which includes another selected sensor segment.

43. A method as defined in claim 40, further comprising the step of monitoring a portion of the output signal which lies within a frequency bandwidth which is in the acoustic range and which is narrower than the frequency band between said component signals.

* * * * *

UNITED STATES PATENT AND TRADEMARK OFFICE
CERTIFICATE OF CORRECTION

PATENT NO. : 4,818,064                       Page 1 of 2

DATED       : April 4, 1989

INVENTOR(S) : Robert C. Youngquist, Robert H. Wentworth, and Kenneth A. Fesler

It is certified that error appears in the above-identified patent and that said Letters Patent is hereby corrected as shown below:

Column 2, line 24, please correct "all sensors has passed" to --all sensors had passed--.

Column 10, line 19, please correct "formed n respective" to --formed in respective--.

Column 11, line 39, please correct "synthesize 300" to --synthesizer 300--.

Column 11, line 52, please correct "The ocousto-optic" to --The acousto-optic--.

Column 11, line 57, please correct "the acousto-optical" to --the acousto-optic--.

Column 14, line 28, please correct "where $\phi(\Delta 1/c)$" to --where $\gamma(\Delta 1/c)$--.

Column 14, line 31, please correct "of $\phi$. Therefore, $\phi$ may" to --of $\gamma$. Therefore, $\gamma$ may--.

UNITED STATES PATENT AND TRADEMARK OFFICE
CERTIFICATE OF CORRECTION

PATENT NO. : 4,818,064

DATED : April 4, 1989

INVENTOR(S) : Robert C. Youngquist, et al

It is certified that error appears in the above-identified patent and that said Letters Patent is hereby corrected as shown below:

Column 16, line 24, please correct "were is at" to --and is at --

Signed and Sealed this

Seventeenth Day of July, 1990

Attest:

HARRY F. MANBECK, JR.

Attesting Officer

Commissioner of Patents and Trademarks